(12) United States Patent
Ohashi

(10) Patent No.: US 8,094,935 B2
(45) Date of Patent: Jan. 10, 2012

(54) REPRESENTATIVE COLOR EXTRACTING METHOD AND APPARATUS BASED ON HUMAN COLOR SENSE AND DATA HISTOGRAM DISTRIBUTIONS

(75) Inventor: Yosuke Ohashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 967 days.

(21) Appl. No.: 12/050,270

(22) Filed: Mar. 18, 2008

(65) Prior Publication Data

US 2008/0232686 A1 Sep. 25, 2008

(30) Foreign Application Priority Data

Mar. 19, 2007 (JP) .................................. 2007-070270

(51) Int. Cl.
*G06K 9/36* (2006.01)
(52) U.S. Cl. ........ 382/168; 382/167; 345/596; 358/3.01
(58) Field of Classification Search .................. 382/167, 382/168; 345/596; 358/3.01
See application file for complete search history.

(56) References Cited

U.S. PATENT DOCUMENTS

| | | | |
|---|---|---|---|
| 4,805,016 A * | 2/1989 | Kato ............................... 348/71 |
| 7,227,992 B2 * | 6/2007 | Ono et al. ..................... 382/167 |
| 2003/0011612 A1 * | 1/2003 | Luo et al. ...................... 345/589 |
| 2005/0244072 A1 * | 11/2005 | Imai .............................. 382/254 |

FOREIGN PATENT DOCUMENTS

| JP | 10-289242 A | 10/1998 |
|---|---|---|
| JP | 2003-216948 A | 7/2003 |

* cited by examiner

*Primary Examiner* — Vikkram Bali
*Assistant Examiner* — Eueng-Nan Yeh
(74) *Attorney, Agent, or Firm* — Birch, Stewart, Kolasch & Birch, LLP

(57) ABSTRACT

A histogram generating section generates a histogram for each channel of a color space which shows colors of pixels constituting an image, in which tone levels of said channel are divided into plural intervals as classes, and frequency of appearance of tone levels of the pixels in each interval is shown as degree. An interval extraction section extracts the intervals in each of which the frequency of appearance becomes local maximal value. A score calculation section calculates scores of the extracted intervals. The score indicates visibility of color to human based on human color sense. An interval selection section selects one or more extracted interval to be representative color, based on the calculated scores. A representative color extraction section generates the representative colors based on tone levels of the selected intervals.

10 Claims, 5 Drawing Sheets

FIG.4
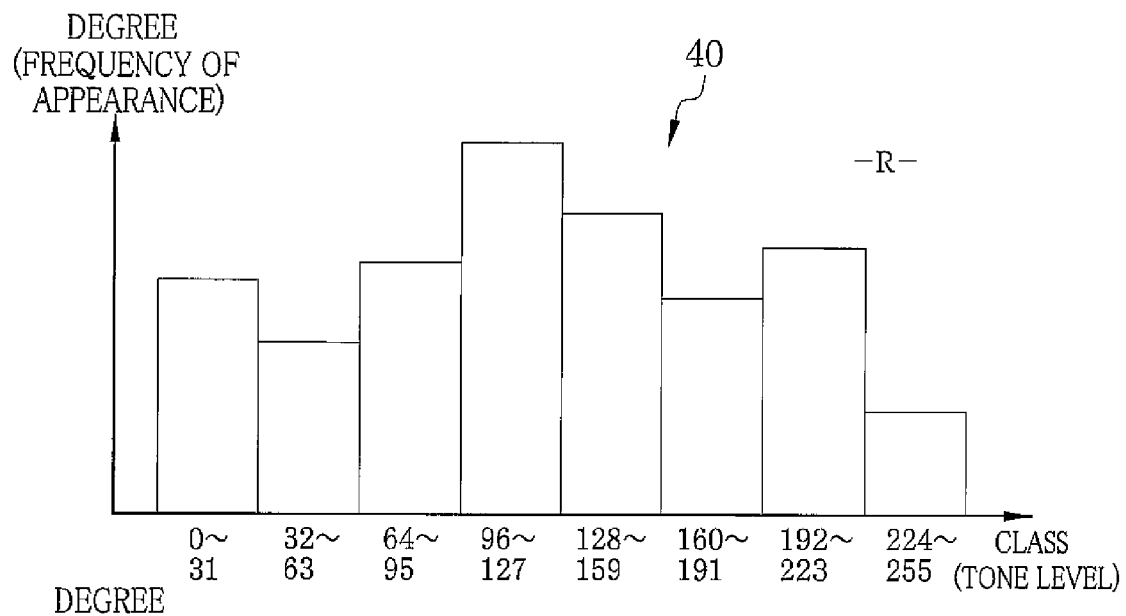
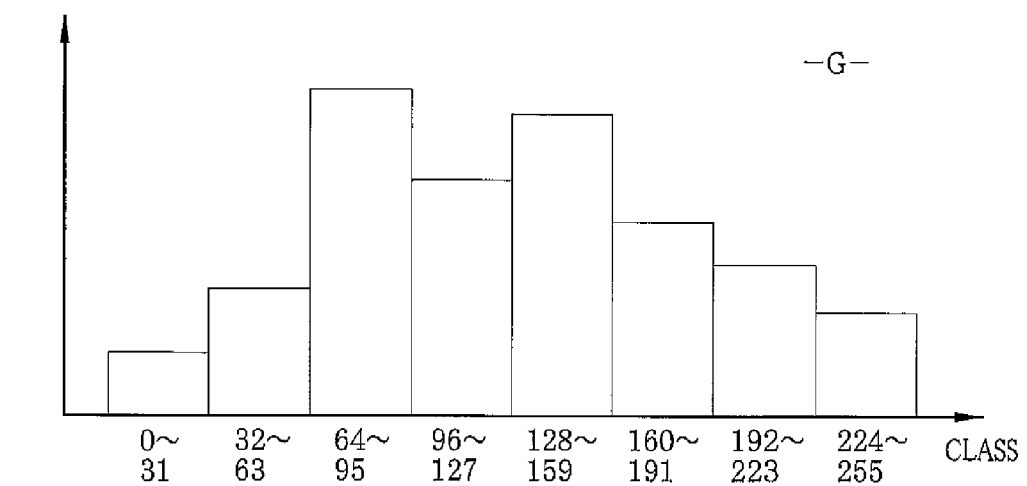
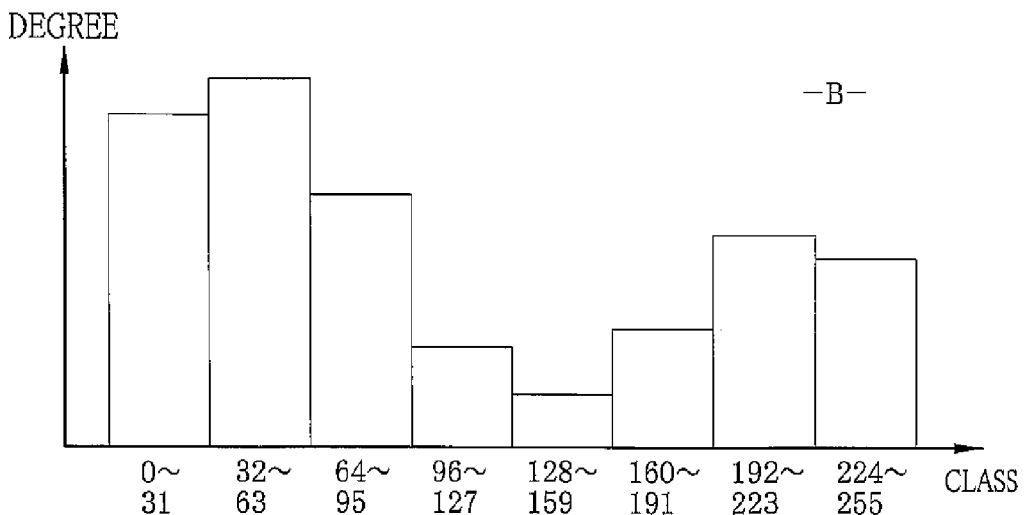

REPRESENTATIVE COLOR EXTRACTING METHOD AND APPARATUS BASED ON HUMAN COLOR SENSE AND DATA HISTOGRAM DISTRIBUTIONS

BACKGROUND OF THE INVENTION

1. Field of the Invention

The present invention relates to a method and an apparatus for extracting a representative color which represents visual impression of an image.

2. Description of the Related Arts

Recently, digital cameras and camera phones are becoming popular, and users are becoming to serve captured images in a personal computer at home, apply image processing such as color correction and image quality correction to the images, and order prints through the Internet. For accommodating such user's needs, various techniques for easy search of images by sorting and organizing enormous number of images are developed. Especially, a technique in which a representative color representing visual impression of an image is used as an index for sorting and organizing images has been known (see Japanese Patent Laid-Open Publications No. 10-289242 and No. 2003-216948).

The Japanese Patent Laid-Open Publication No. 10-289242 detects an area where hue changes most in an image (high-visibility area for human) and extracts a representative color based on the detected area (called as the local representative color extraction processing). When the representative color is not extracted with the local representative color extraction processing, the representative color is extracted based on a frequency of hue of a full screen (called as the global representative color extraction processing). When the representative color is not extracted with the local representative color extraction processing, the global representative color extraction processing is not performed. Then a sensitivity vector that shows the correspondence relation between the image and an impression word corresponding to coloration is calculated based on the color difference between the representative color and the coloration that is preliminarily prepared, and the calculation result is stored.

To generate a histogram compatible with human color sense for extracting a representative color, the Japanese Patent Laid-Open Publication No. 2003-216948 divides an HSV color space into a plurality of areas in saturation direction, reducing the division number in value direction for an area with large saturation and increasing the division number in hue direction (since human is insensitive to color change caused by value change, and sensitive to hue change in this area), while increasing the division number in the value direction for an area with small saturation and reducing the division number in the hue direction (since human is sensitive to color change caused by value change, and insensitive to hue change in this area). By using such histogram, areas where human is sensitive to color difference can be more precisely analyzed.

However, in the Japanese Patent Laid-Open Publication No. 10-289242, when whether the local representative color extraction processing or the global representative color extraction processing extracts the representative color, the other is not performed. Accordingly, it is possible to extract an inappropriate color as the representative color. In addition, it will take a long time to constantly perform both of the local representative color extraction processing and the global representative color extraction processing, for solving this problem.

In the Japanese Patent Laid-Open Publication No. 2003-216948, colors to which human is insensitive to color difference (similar colors) are not extracted as the representative colors. However, there may be a case that similar colors are suitable as the representative colors. Accordingly, it is possible to extract inappropriate colors as the representative colors.

SUMMARY OF THE INVENTION

An object of the present invention is to provide a method and an apparatus for extracting a representative color which certainly corresponds to human color sense.

In order to achieve the above and other objects, a representative color extracting method of the present invention comprises a histogram generating step, an interval extraction step, a score calculation step, an interval selection step and a representative color generating step. In the histogram generating step, a histogram for each channel of a color space which shows colors of pixels constituting the image is generated. In the histogram, tone levels of the channel are divided into plural intervals as classes, and frequency of appearance of tone levels of the pixels in each interval are shown as degree. In the interval extraction step, the intervals in which the frequencies of appearance become local maximal value are extracted. In the score calculation step, a score of each of extracted intervals is calculated. The score indicates visibility of colors to human in consideration of human color sense. In the interval selection step, the intervals to be the representative color are selected from the extracted intervals according to the score of each interval. In the representative color generating step, the representative color is generated based on the tone levels of the selected intervals.

It is preferable that a reduction processing step is provided for reducing a size of the image before the histogram generating step.

It is preferable that the score is calculated according to the frequency of appearance in the score calculation step.

It is preferable that a histogram of HSV color space whose channels are hue, saturation and brightness is generated in the histogram generating step, and the score is calculated according to at least one of the hue, saturation and brightness in the score calculation step.

It is preferable that the score is calculated according to positions of pixels which have tone levels within the extracted interval in the score calculation step.

It is preferable that the intervals whose scores are ranked in the top n (n is natural number), or the intervals whose scores are over a predetermined threshold value, are selected as the intervals to be the representative color in the interval selection step.

It is preferable that a center value, a minimum value or a maximum value of each of the selected intervals or an average tone level of the pixels within each of the selected intervals is determined as the tone level of the representative color in the representative color generating step.

It is preferable that a representative color displaying step is provided for displaying the generated representative color. In addition, it is preferable that a representative color storing step is provided for storing the generated representative color.

A representative color extracting apparatus of the present invention comprises a histogram generating section, an interval extraction section, score calculation section, an interval selection section and a representative color generating section. In the histogram generating section, a histogram for each channel of a color space which shows colors of pixels constituting the image is generated. In the histogram, tone levels of the channel are divided into plural intervals as classes, and frequency of appearance of tone levels of the pixels in each interval are shown as degree. In the interval extraction section, the intervals in which the frequencies of appearance become local maximal value are extracted. In the score calculation section, a score of each of extracted intervals is calculated. The score indicates visibility of colors to human in consideration of human color sense. In the interval selection section, the intervals to be the representative color are selected from the extracted intervals according to the score of each interval. In the representative color generating section, the representative color is generated based on the tone levels of the selected intervals.

According to the representative color extracting method and the representative color extracting apparatus of the present invention, since the histogram showing distribution of colors of the image is generated, the score of each color is calculated in consideration of human color sense, and the representative color is generated based on the score, the representative color which certainly corresponds to human color sense can be extracted.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 4 is an explanatory diagram showing examples of histograms;

DETAILED DESCRIPTION OF THE PREFERRED EMBODIMENTS

Figure 1:
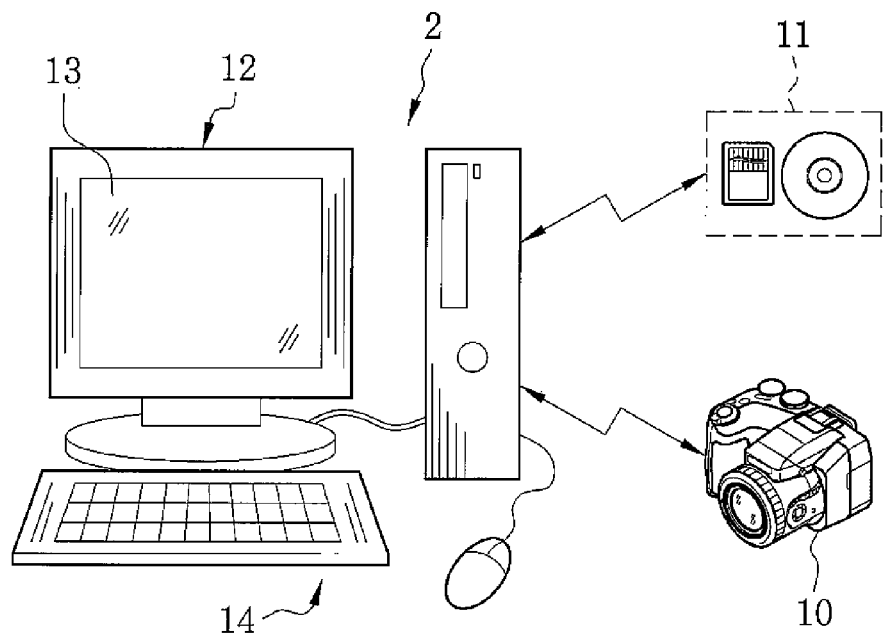
FIG. 1 is a schematic view showing a hardware composition of an image processing system.

In FIG. 1, an image processing system 2 is provided to import image data obtained with a digital camera 10, or image data recorded in a recording medium 11, such as a memory card or CD-R, into a personal computer (hereinafter, abbreviated as PC) 12 which performs various image processing to the image data. The image data recorded in the recording medium 11 includes images on photo films digitized into TIFF or JPEG format.

The digital camera 10 is connected to the PC 12 through, for instance, a communication cable compliant with IEEE 1394 or USB (Universal Serial Bus), a wireless LAN or the like, and communicate data with the PC 12 mutually. The recording medium 11 exchanges data with the PC 12 through a specific driver.

Figure 2:
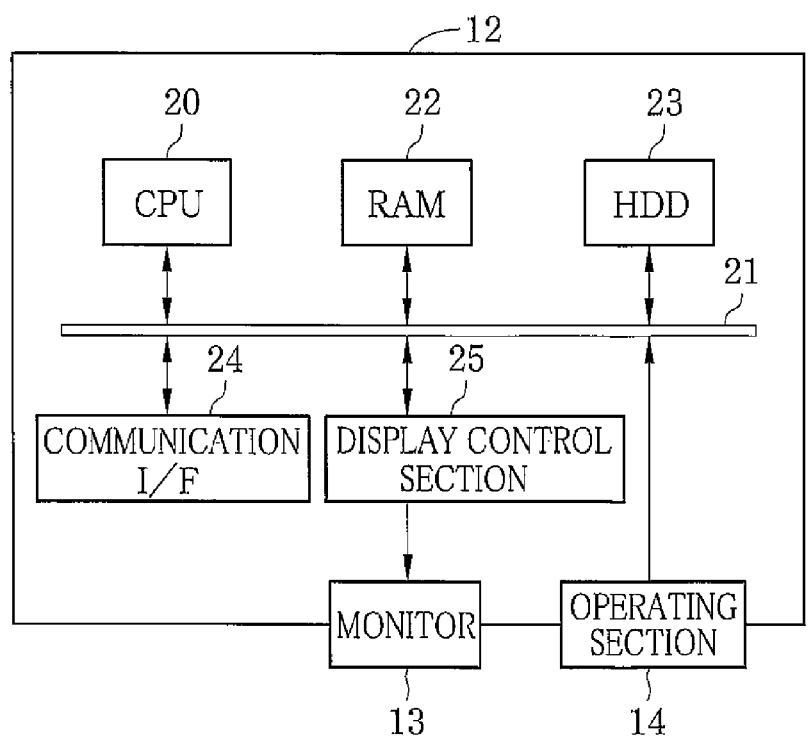
FIG. 2 is a block diagram showing an internal composition of a personal computer.

The PC 12 includes a monitor 13 and an operating section 14 constituted of a keyboard and a mouse. In FIG. 2, a CPU 20 is connected to all components of the PC 12 through a data bus 21, and comprehensively controls operations of the PC 12. As the components of the PC 12, there are a RAM 22, a hard disk drive (hereinafter, abbreviated as HDD) 23, a communication interface (I/F) 24 and a display control section 25 in addition to the above-described operating section 14.

The HDD 23 stores programs of a viewer soft for performing various image processes on the PC 12 and image data of plural images read from the digital camera 10 or recording medium 11, in addition to various programs and data for operating the PC 12. The CPU 20 reads each program from the HDD 23 and expands the program in the RAM 22, and sequentially executes the program. In addition, the CPU 20 operates each section of the PC 12 according to operation signal input from the operating section 14.

Through the I/F 24, the PC 12 performs data communication with an external device such as the digital camera 10 or a communication network such as the Internet. The display control section 25 performs display control on the monitor 13, for example displays various windows relating to the viewer soft on the monitor 13.

For loading the image data, the viewer soft is started by operation of the operating section 14. In the viewer soft, there is a mode for extracting a representative color of the image (the representative color extraction mode), in addition to the mode for loading the image data. The representative color is a color which represents visual impression of the image, for example a color which occupies large area of the image.

Figure 3:
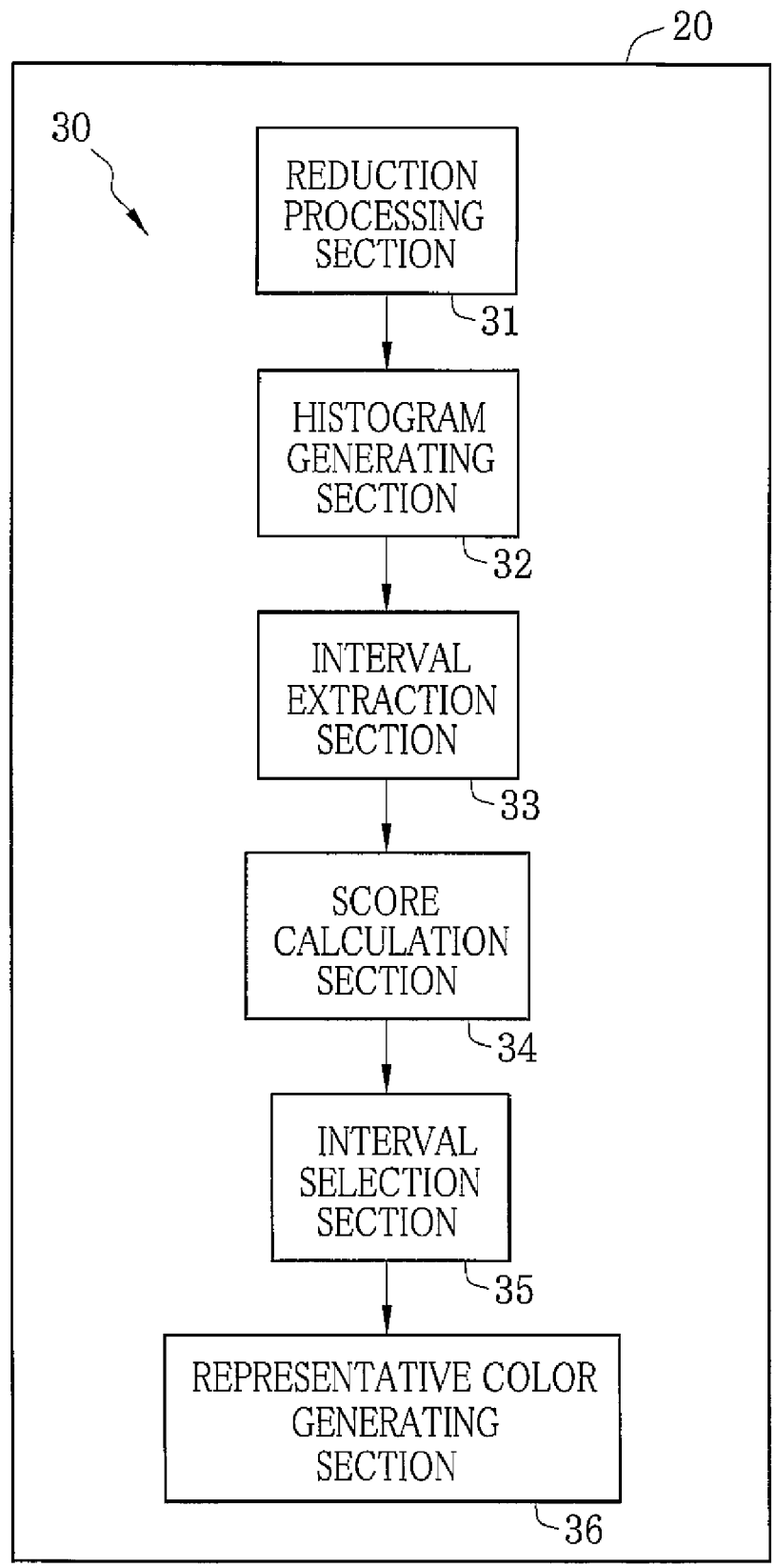
FIG. 3 is a block diagram showing a composition of a representative color extraction section.

When the representative color extraction mode is selected, a representative color extraction section 30 shown in FIG. 3 is built on the CPU 20. The representative color extraction section 30 is composed of a reduction processing section 31, a histogram generating section 32, an interval extraction section 33, a score calculation section 34, an interval selection section 35, and a representative color generating section 36.

The reduction processing section 31 applies reduction process such as pixel thinning to data of an image inputted to extract representative colors (hereinafter the image is called as the input image, and the data is called as the input image data). Concretely, the reduction processing section 31 reduces the size of the input image from for example 1600×1200 pixels to for example 640×480 pixels, without losing the character of the image. Then the reduction processing section 31 outputs the reduced size of input image data into the histogram generating section 32. Note that although an appropriate reduced size is variable according to degree of precision of an object in an input image, characters of images may not be lost when general landscape images and the like are uniformly reduced in the above-described size.

The histogram generating section 32 generates for example a histogram 40 shown in FIG. 4. In this histogram, tone levels of RGB (red, green, blue) channels which show colors of pixels of reduced input image from the reduction processing section 31 are shown in eight bit data ranging from 0 to 255. The tone levels are divided into eight equal intervals (tone levels 0 to 31, 32 to 63, 64 to 95, 96 to 127, 128 to 159, 160 to 191, 192 to 223, and 224 to 255), and the eight intervals are arranged along the horizontal axis (class) of the histogram 40. Frequency of appearance of tone levels of pixels in each interval is shown along the vertical axis (degree) of the histogram 40.

The generation of the histogram 40 is performed by identifying a section of a tone level of each pixel and updating a frequency of appearance in the identified interval. The histogram generating section 32 generates a histogram 40 for each channel of RGB, and outputs data of generated histograms 40 to the interval extraction section 33.

Although tone levels are divided into the equal intervals in the above embodiment, there may be finely divided intervals and coarsely divided intervals. In addition, a dividing manner may be different according to each channel of RGB. The frequency of appearance may be shown either by number of appeared tone levels or by proportion of tone levels to all pixels.

Instead of or in addition to the histogram 40 of each channel of RGB, a histogram of HSV (hue, saturation, brightness value) color space may be generated. In this case, by the following conversion equations, the RGB channels can be easily converted to the HSV channels.

The following are determined:

Value V=max {R, G, B} (maximum value of tone level of each channel of RGB); and

Saturation S=(V−v)/V (note that v=min {R, G, B} (minimum value of tone level of each channel of RGB)).

Hue H (radian) is calculated as follows:

When $R=V, H=\pi/3(b-g)$;

When $G=V, H=\pi/3(2+r-b)$; and

When $B=V, H=\pi/3(4+g-r)$, wherein $r=(V-R)/(V-v)$ $g=(V-G)/(V-v)$ $b=(V-B)/(V-v)$.

(Note that when H<0, 2π is added to H. In addition, to convert Hue H (radian) to Hue H (°), 180/π is multiplied to Hue H (radian)).

The interval extraction section 33 analyzes data of the histogram 40 from the histogram generating section 32, to extract intervals in which the frequency of appearance become local maximal value, for each channel of RGB. Concretely, the interval extraction section 33 compares adjacent intervals about the frequency of appearance, and extracts an interval having the frequency of appearance higher than both adjacent intervals. In the example of FIG. 4, the interval extraction section 33 extracts the intervals of 96 to 127 and 192 to 223 for R, the intervals of 64 to 95 and 128 to 159 for G, and the intervals of 32 to 63 and 192 to 223 for B. Although the interval extraction section 33 extracts plural intervals for each color in this example, there is also a case that the interval extraction section 33 extracts only one interval. The interval extraction section 33 outputs data of the extracted intervals toward the score calculation section 34.

The score calculation section 34 calculates a score of the extracted interval, based on at least one of following methods (a) to (e). The score is determined in consideration of human visual feature for extracting a representative color close to human color sense, and indicates how much attention the color attracts from human in other words, visibility of colors to human. Accordingly, the color firstly attracts human's attention when the human sees an image (the human might recognize the color as the representative color) will have the highest score.

(a) The score calculation section 34 calculates the score according to the frequency of appearance. In this case, for example the interval in which the frequency of appearance is over a threshold level is given a high score, from the standpoint that the interval having higher frequency of appearance is more eye-catching. Instead of above, degree of increasing and decreasing of the score may be changed according to the degree of frequency of appearance.

(b) The score calculation section 34 calculates the score according to hue, when the histogram of HSV is generated. In this case, for example the interval in which distance from green in the HSV color space (green is eye-catching color according to human color sense) is no more than a threshold level is given a high score. Instead of above, degree of increasing and decreasing of the score may be changed according to the degree of distance from green in the HSV color space.

(c) The score calculation section 34 calculates the score according to saturation. In this case, for example the interval in which the saturation is under a threshold level is given a low score. Instead of above, degree of increasing and decreasing of the score may be changed according to the degree of saturation. The reason is that generally human focuses on colors with high saturation, and colors with low saturation (for example gray, white and black) are highly likely not to be recognized as the representative color. For example, in an image of "a portrait of a person in a gray background" which is often found in so-called stock photos, an observer firstly focuses on a flesh color of the person, colors of clothes and so on, and does not focus on the gray background even when the gray area is larger than the person in the image. However, when the background has a color such as green whose saturation is high, an observer tends to focus on the background.

(d) The score calculation section 34 calculates the score according to value. In this case, for example the interval in which the value is under a lower threshold level is given a low score, and the interval in which the value is over an upper threshold level is given a low score. The intension is that low scores are given to colors which are highly likely not to be recognized as the representative color (a color with too low value is near black, and a color with too high value is near white).

(e) The score calculation section 34 calculates the score according to positions of pixels which have tone levels within the extracted interval. In this case, for example the interval including the tone level of the pixel positioned closer to the center of the image (the center of the image is highly likely to be focused by human) is given a higher score. Concretely, input image data is analyzed again to extract pixels having tone levels within the extracted intervals. Then the score calculation section 34 determines image regions where the extracted pixels are dominant (image regions in each of which there are the extracted pixels as a mass having a certain area), calculates distances between the center of each region and the center of the image, and gives higher score to the interval including the image region having the shorter distance (closer to the center of the image).

The score calculation section 34 outputs data of scores calculated according to at least one of the methods (a) to (e), to the interval selection section 35.

The interval selection section 35 selects the intervals whose scores are ranked in the top n (n is natural number), or the intervals whose scores are over a predetermined threshold value, as intervals to be the representative colors. The interval selection section 35 outputs data of the selected intervals to the representative color generating section 36.

The representative color generating section 36 determines one of the center value, the minimum value and the maximum value of the intervals selected by the interval selection section 35 as the tone levels of the representative color. In the example of FIG. 4, when the selected intervals are R; 96 to 127, G; 64 to 95, and B; 32 to 63, the tone levels of the representative color are the center values (R; 111 (or 112), G; 79 (or 80), and B; 47 (or 48)), the minimum values (R; 96, G; 64, and B; 32), or the maximum values (R; 127, G; 95, and B; 63).

Instead of above, the representative color generating section 36 may determine the average tone level of the pixels within the interval selected by the interval selection section 35 as the tone level of the representative color. For example, when the selected interval is R; 96 to 127, in which there are 10 pixels of tone level 100, 5 pixels of tone level 110 and 20 pixels of tone level 115, the tone level of the representative color is calculated by following equation:

(100×10+110×5+115×20)/(10+5+20)=110

The representative color generating section 36 generates the representative color by combining the tone levels of channels of RGB (or HSV) calculated according to one of the above-described methods. Then the representative color generating section 36 outputs data of the generated representative color to the CPU 20.

The CPU 20 associates the input image data and the data of the representative color, and stores them in the HDD 23. Instead of above, the CPU 20 may store the data of the representative color in a file different to a file storing the input image data, both are in the HDD 23.

Figure 5:
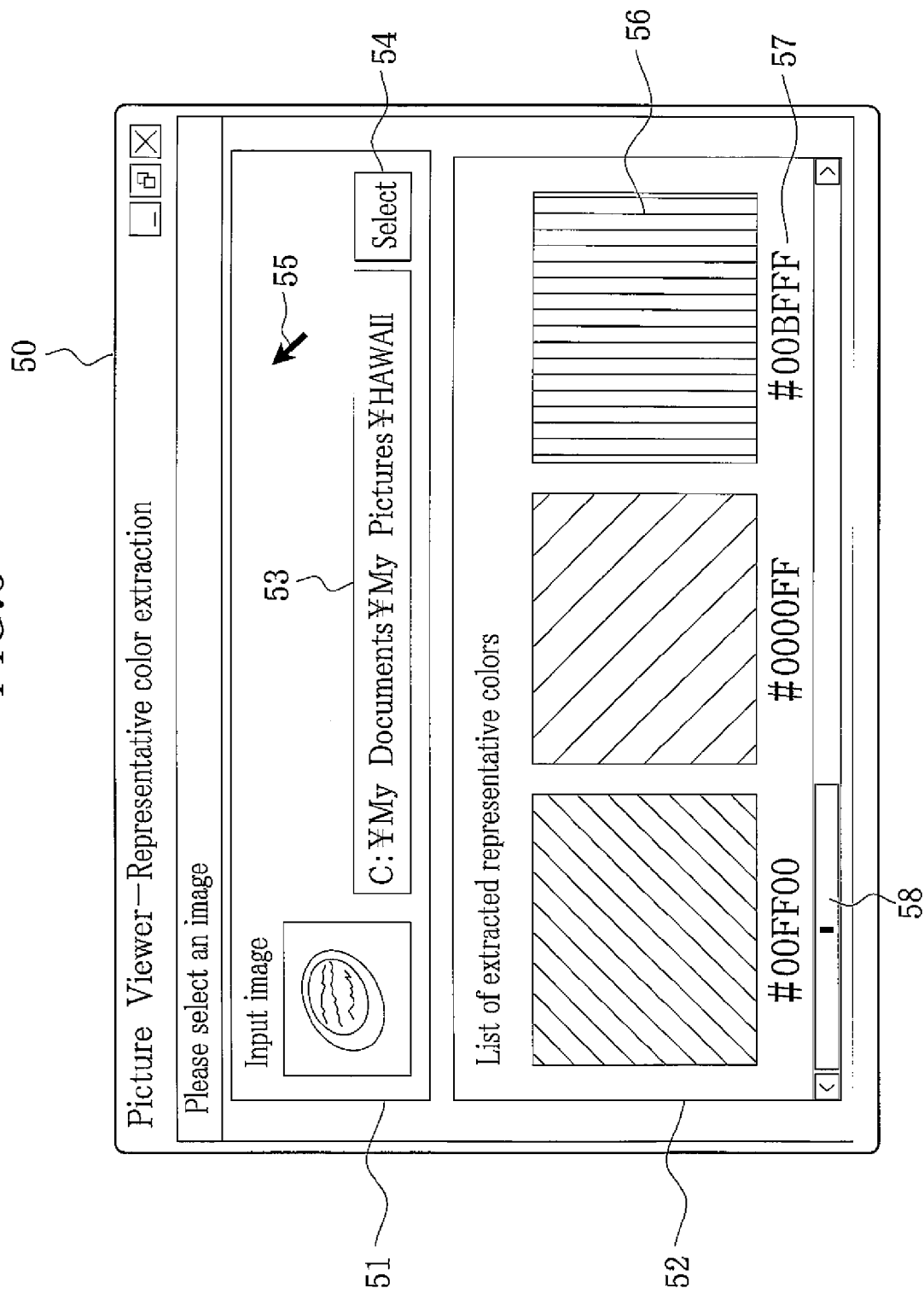
FIG. 5 is an explanatory diagram showing a representative color extraction window.

In the representative color extraction mode, a representative color extraction window 50 shown in FIG. 5 is displayed on the monitor 13. In the representative color extraction window 50, a region 51 where the input image is displayed and a region 52 where a list of the representative colors is displayed are provided.

In the region 51, there are a file dialog 53 where a thumbnail of the input image and a pass of the destination of the input image in the HDD 23 are displayed, and a select button 54 for selecting the input image. When the mouse of the operating section 14 is operated such that a pointer 55 is moved to the select button and then the mouse is clicked, the file dialog is enlarged and a list of icons showing files and folders stored in the HDD 23 are displayed in a hierarchical manner. Then the mouse is operated such that the pointer 55 is moved to an icon of the file of the desired image, to select the input image.

Before selecting the input image, the region 52 itself is not displayed in the window, or nothing is displayed in the region 52. After the selection of the input image and the extraction of the representative color as described above, a list of samples 56 of the representative colors is displayed in the region 52. Below each sample 56, a color code 57, which represents the tone level of the representative color by hexadecimal numeral, is displayed.

The color code 57 is displayed in form of for example "#000000", in order of RGB. When an image of a reef-fringed island floating on a blue sea is the selected input image as shown in FIG. 5, the representative colors extracted by the representative color extraction section 30 are "#00FF00" (green), "#0000FF" (blue) and "#00BFFF" (light blue), displayed in this order from left. Although the order for listing the representative colors is not limited, for example the colors are displayed in descending order of score calculated by the score calculation section 34. Instead of or in addition to the color code 57, numeric value itself of the tone level may be displayed. Note that at the bottom of the region 52, a scroll bar 58 is provided for scrolling the thumbnails to be displayed.

Figure 6:
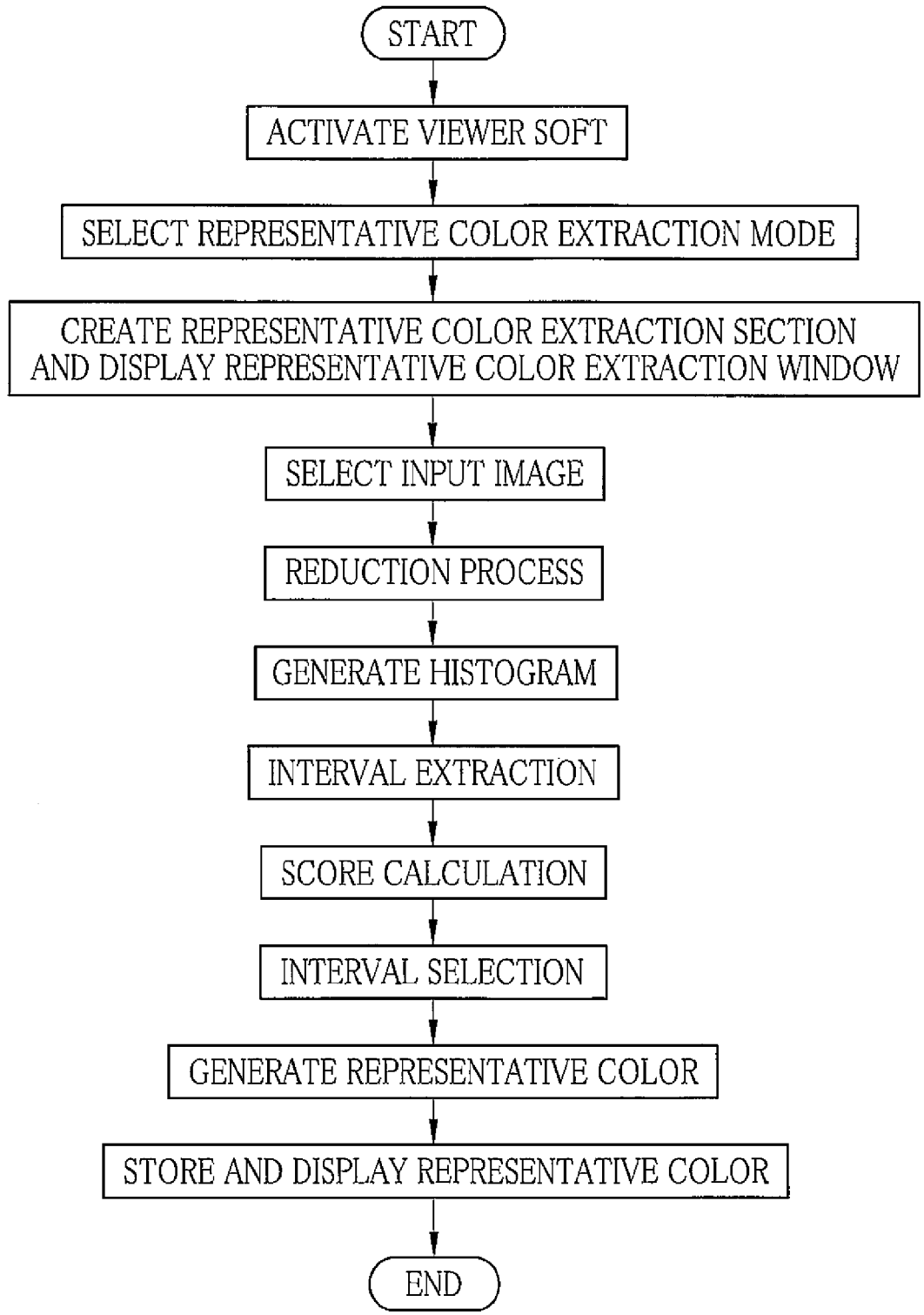
FIG. 6 is a flowchart showing processing procedures for extracting representative color.

Next, processing procedures of the image processing system 2 having the above-described configuration are described with reference to a flowchart of FIG. 6. At first, the viewer soft is activated and the representative color extraction mode is selected, and then the representative color extraction section 30 is created on the CPU 20. In addition, the representative color extraction window 50 is displayed on the monitor 13. The user operates the select button 54 with use of the operating section 14, to select the input image from the file dialog 53. Then data of the selected input image is outputted to the CPU 20.

The input image data is inputted in the reduction processing section 31. The reduction processing section 31 reduces the size of the input image data without losing the character of the image. The input image with the reduced size is outputted to the histogram generating section 32.

The histogram generating section 32 generates the histogram 40 in which the tone levels of RGB channels showing colors of pixels of reduced input image from the reduction processing section 31 are divided into eight equal intervals shown along the horizontal axis (class), and the frequencies of appearance of tone levels in all pixels for respective intervals are shown along the vertical axis (degree) The data of the histogram 40 generated by the histogram generating sections 32 is outputted to the interval extraction section 33.

In the interval extraction section 33, the intervals in which the frequency of appearance become the local maximal value are extracted for each channel of RGB, for example by comparing adjacent intervals about the frequency of appearance. The data of the extracted intervals is outputted to the score calculation section 34.

In the score calculation section 34, the scores of the extracted intervals are calculated according to at least one of (a) frequency of appearance, (b) hue, (c) saturation, (d) value, and (e) positions of pixels which have tone levels within the extracted interval. The data of the scores calculated by the score calculation section 34 is outputted to the interval selection section 35.

The interval selection section 35 selects the intervals whose scores are ranked in the top n, or the intervals whose scores are over the predetermined threshold value. Then the representative color generating section 36 determines the center value, the minimum value, the maximum value of each interval or the average tone level of the pixels within each interval selected by the interval selection section 35 as the tone level, to generate the representative color.

Then the representative color generating section 36 outputs data of the generated representative color to the CPU 20. The CPU 20 associates the input image data and the data of the representative color, and stores them in the HDD 23, or the CPU 20 stores the data of the representative color in the file different to the file storing the input image data, both are in the HDD 23. At the same time, the list of the samples 56 and the color codes 57 of the representative colors are displayed in the region 52 of the representative color extraction window 50. The data of the representative color stored in the HDD 23 is for example read out and used for searching images by color, which enables easy search of image.

As described above, since the intervals are extracted as the candidates of the representative color with reference to the histogram, the scores are given to the extracted intervals in consideration of human color sense, and the representative color is generated (selected from the candidates) according to the scores, the representative color closer to human color sense can be generated. In addition, since the reduction processing section 31 reduces the size of the input image before the generation of the histogram 40, amount of the data handled by the histogram generating section 32 is reduced and processing time can be also reduced.

In the score calculation by the score calculation section 34, colors which are hardly recognized as the representative color (such as colors with low saturation or value) have relatively low scores, but do not be excluded from possibility to be candidates of the representative color. Accordingly, even in a case that a color which is hardly recognized as the representative color is obviously the representative color in an image, the color which is visually suitable as the representative color can be extracted as the representative color.

Although the input image is selected with use of the file dialog 53 in the above embodiment, the file of the input image may be moved into the representative color extraction window 50 by drug and drop. In addition, it may be that the user selects whether storing of the data of the representative color is performed or not, after the result of extraction of the representative color is displayed on the representative color extraction window 50.

The methods for generating the histogram, for extracting the intervals, for calculation of the scores, for selection of the intervals, for generating the representative color, the configuration of the representative color extraction window 50 and so on shown in the above embodiment are example, and the present invention is not limited above.

In the above embodiment, the image processing is performed on the PC 12 with use of the viewer soft. However, the image processing may be performed on a home page through the Internet. In this case, a hardware corresponding to the representative color extraction section 30 is provided in a server for administrating the home page.

In the above embodiment, the representative color extraction section 30 is built on the CPU 20 when the viewer soft is activated and the representative color extraction mode is selected. However, the representative color extraction section 30 may be incorporated in the PC 12, in form of hardware such as a discrete circuit or a FPGA. Or the representative color extraction section 30 may be connected to the PC 12, as an independent device.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A representative color extracting method for extracting a representative color which represents visual impression of an image, said method comprising steps of:
   a histogram generating step for generating a histogram for each channel of a color space which shows colors of pixels constituting said image, tone levels of said channel being divided into plural intervals as classes in said histogram, and frequency of appearance of tone levels of said pixels in each interval being shown as degree in said histogram;
   an interval extraction step for extracting intervals in each of which said frequency of appearance becomes local maximal value;
   a score calculation step for calculating a score of each of extracted intervals, said score indicating visibility of color to human in consideration of human color sense;
   an interval selection step for selecting one or more said extracted intervals to be said representative color according to said score of each interval; and
   a representative color generating step for generating said representative color based on said tone levels of said selected intervals.

2. A representative color extracting method claimed in claim 1, further comprising a reduction processing step for reducing a size of said image before said histogram generating step.

3. A representative color extracting method claimed in claim 1, wherein said score is calculated according to said frequency of appearance in said score calculation step.

4. A representative color extracting method claimed in claim 1, wherein a histogram of HSV color space whose channels are hue, saturation and brightness is generated in said histogram generating step,
   and wherein said score is calculated according to at least one of said hue, saturation and brightness in said score calculation step.

5. A representative color extracting method claimed in claim 1, wherein said score is calculated according to positions of pixels each of which has the tone level within said extracted interval in said score calculation step.

6. A representative color extracting method claimed in claim 1, wherein the intervals whose scores are ranked in the top n (n is natural number), or the intervals whose scores are over a predetermined threshold value, are selected as said intervals to be said representative color in said interval selection step.

7. A representative color extracting method claimed in claim 1, wherein a center value, a minimum value, or a maximum value of each of said selected intervals or an average tone level of the pixels within each of said selected intervals is determined as said tone level of said representative color in said representative color generating step.

8. A representative color extracting method claimed in claim 1, further comprising a representative color displaying step for displaying said generated representative color.

9. A representative color extracting method claimed in claim 1, further comprising a representative color storing step for storing said generated representative color.

10. A representative color extracting apparatus for extracting a representative color which represents visual impression of an image, said apparatus comprising:
   a processor programmed to control:
   a histogram generating section for generating a histogram for each channel of a color space which shows colors of pixels constituting said image, tone levels of said channel being divided into plural intervals as classes in said histogram, and frequency of appearance of tone levels of said pixels in each interval being shown as degree in said histogram;
   an interval extraction section for extracting intervals in each of which said frequency of appearance becomes local maximal value;
   a score calculation section for calculating a score of each of extracted intervals, said score indicating visibility of color to human in consideration of human color sense;
   an interval selection section for selecting one or more said extracted intervals to be said representative color according to said score of each interval; and
   a representative color generating section for generating said representative color based on said tone level of said selected intervals.

* * * * *